(12) United States Patent
Funke et al.

(10) Patent No.: US 11,584,630 B2
(45) Date of Patent: Feb. 21, 2023

(54) SANITARY FITTING FOR DISPENSING PREPARED LIQUIDS

(71) Applicant: BLANCO GmbH + Co KG, Oberderdingen (DE)

(72) Inventors: Thomas Funke, Eppingen (DE); Özkan Kaya, Kraichtal (DE)

(73) Assignee: BLANCO GMBH + CO KG, Oberderdingen (DE)

( * ) Notice: Subject to any disclaimer, the term of this patent is extended or adjusted under 35 U.S.C. 154(b) by 0 days.

(21) Appl. No.: 16/930,108

(22) Filed: Jul. 15, 2020

(65) Prior Publication Data

US 2021/0017010 A1 Jan. 21, 2021

(30) Foreign Application Priority Data

Jul. 15, 2019 (DE) .......................... 102019210435.5

(51) Int. Cl.
*B67D 1/00* (2006.01)
*B67D 1/08* (2006.01)
(Continued)

(52) U.S. Cl.
CPC ............ *B67D 1/004* (2013.01); *A47J 31/465* (2013.01); *A47J 31/469* (2018.08); *B67D 1/003* (2013.01); *B67D 1/0004* (2013.01); *B67D 1/0012* (2013.01); *B67D 1/0032* (2013.01); *B67D 1/0882* (2013.01); *B67D 1/0888* (2013.01); *E03C 1/0411* (2013.01); *E03C 1/055* (2013.01);
(Continued)

(58) Field of Classification Search
CPC .... B67D 1/004; B67D 1/0004; B67D 1/0012; B67D 1/003; B67D 1/0032; B67D 1/0882; B67D 1/0888; B67D 2210/0001; A47J 31/465; A47J 31/469; E03C 1/0411; E03C 1/055; E03C 2201/40; E03C 1/0412; E03C 2201/45; F16K 11/00; F16K 31/60; F16K 37/0016; F16K 37/0058

See application file for complete search history.

(56) References Cited

U.S. PATENT DOCUMENTS

| | | | | |
|---|---|---|---|---|
| 5,293,901 A | * | 3/1994 | Guzzini | ................ F16K 11/074 137/613 |
| 2003/0132243 A1 | * | 7/2003 | Engel | ................... H05K 13/046 222/61 |

(Continued)

FOREIGN PATENT DOCUMENTS

| | | |
|---|---|---|
| DE | 2127939 A1 | 12/1971 |
| DE | 19858717 A1 | 1/1999 |

(Continued)

*Primary Examiner* — Donnell A Long
(74) *Attorney, Agent, or Firm* — FisherBroyles, LLP; Jason P. Mueller

(57) ABSTRACT

This disclosure relates to a sanitary fitting for dispensing prepared liquids, for example, for beverages. A disclosed system includes a first control element for setting a quantity of the prepared liquid to be dispensed and an actuating element for providing the quantity of prepared liquid set by means of the first control element, wherein at least one second control element is configured to select a type of preparation, for example, from at least two different types of preparation, of non-prepared liquid, wherein the first and the at least one second control element are actuatable independently of one another.

15 Claims, 7 Drawing Sheets

(51) Int. Cl.
*A47J 31/46* (2006.01)
*E03C 1/04* (2006.01)
*E03C 1/05* (2006.01)

(52) U.S. Cl.
CPC .. *B67D 2210/0001* (2013.01); *E03C 2201/40* (2013.01)

(56) References Cited

U.S. PATENT DOCUMENTS

| | | |
|---|---|---|
| 2007/0152074 A1 | 7/2007 | Stowe et al. |
| 2012/0266983 A1 | 10/2012 | Tsai et al. |
| 2015/0037464 A1 | 2/2015 | McHale et al. |
| 2017/0121952 A1 | 5/2017 | Hong et al. |
| 2018/0186655 A1 | 7/2018 | Cobb et al. |
| 2018/0313068 A1* | 11/2018 | Hirsch ................ E03C 1/0403 |
| 2019/0089550 A1* | 3/2019 | Rexach ................ H04L 12/282 |

FOREIGN PATENT DOCUMENTS

| | | | |
|---|---|---|---|
| DE | 102013000773 A1 | 7/2014 | |
| DE | 102013002236 A1 | 8/2014 | |
| EP | 0577164 A1 | 1/1994 | |
| WO | 2007113663 A2 | 10/2007 | |
| WO | WO-2007113663 A2 * | 10/2007 | ............... E03C 1/04 |
| WO | 2016/131500 A1 | 8/2016 | |

* cited by examiner

SANITARY FITTING FOR DISPENSING PREPARED LIQUIDS

This application claims priority to German Patent Application No. 10 2019 210 435.5, filed Jul. 15, 2019, the entire contents of which is incorporated herein by reference.

This disclosure relates to a sanitary fitting for dispensing prepared liquids, for example, for beverages, comprising a first control element for setting the quantity of the prepared liquid to be dispensed and an actuating element for providing the quantity of prepared liquid set by means of the first control element.

The disclosure furthermore relates to a sanitary system for providing and dispensing prepared liquids, for example, for beverages.

The disclosure furthermore relates to a method for providing and dispensing prepared liquids, for example, for beverages.

Sanitary fittings have become known in greatly varying ways. Known sanitary fittings comprise, for example, a fitting body having at least one control element for setting at least one property of a fluid stream conducted through the sanitary fitting. The property can be, for example, the flow rate of the fluid stream or the temperature of the fluid stream. In known sanitary fittings, the fluid stream is mixed from a separate cold water stream and hot water stream by means of a mixing tap and conducted from there to an outlet.

To enhance the functionality, a sanitary fitting has become known, for example, from DE 10 2013 000 773 A1 or DE 10 2013 002 236 A1, having at least one first actuating element for setting the temperature and/or quantity of mixed water and having at least one second actuating element for setting the quantity of hot water. The second actuating element, which allows setting of the quantity of hot water, is formed in this case as a rotary selector switch. It firstly has to be rotated in a first direction to activate the hot water function. Subsequently, it has to be rotated in the direction opposite to the first direction to set the desired quantity of hot water.

It is disadvantageous in this case that the operation of the second actuating element is cumbersome and complex. At the same time, the flexibility with respect to providing different prepared fluid streams is significantly restricted.

One object of the disclosure is therefore to provide a sanitary fitting for dispensing prepared liquids, for example, for beverages, and a corresponding sanitary system which allow simple operability, a high level of flexibility, and cost-effective implementation.

A further object of the disclosure is to provide a method for providing and dispensing prepared liquids, for example, for beverages, which is to be carried out simply and cost-effectively and allows a high level of flexibility.

A further object of the disclosure is to provide an alternative sanitary fitting, an alternative sanitary system, and an alternative method for providing and dispensing prepared liquids, for example, for beverages.

This disclosure achieves the objects in one embodiment using a sanitary fitting for dispensing prepared liquids, for example, for beverages, comprising a first control element for setting the quantity of the prepared liquid to be dispensed and an actuating element for providing the quantity of prepared liquid set by means of the first control element, in that at least one second control element is arranged for selecting a type of preparation, for example, from at least two different types of preparation, of non-prepared liquid, wherein the first and the at least one second control element are actuatable independently of one another.

The disclosure achieves the objects in a further embodiment using a sanitary system for providing prepared liquids, for example, for beverages, comprising a sanitary fitting as claimed in any one of claims 1 to 10, a preparation device, which is connected to the sanitary fitting for providing prepared liquid, and a control device, which is connected, on the one hand, to the sanitary fitting and, on the other hand, to the preparation device, for controlling the sanitary fitting and the preparation device.

The disclosure achieves the objects in a further embodiment using a method for providing and dispensing prepared liquid, for example, water, for beverages using a sanitary fitting according to any one of claims 1 to 10, comprising the following stages setting a quantity of prepared liquid to be dispensed by means of the first control element, providing or setting at least one type of preparation, for example, selected from at least two different types of preparation, of non-prepared liquid by means of the at least one second control element, actuating the actuating element, dispensing prepared liquid and a neutral liquid, for example, non-prepared liquid, in such a way that before reaching the set quantity, exclusively neutral liquid is provided for dispensing and is dispensed, and the dispensing is stopped upon reaching the set quantity, wherein after complete dispensing, the set quantity of prepared liquid has been dispensed in the set quantity and type of preparation.

The disclosure achieves the objects in a further embodiment by way of a control device for a sanitary fitting, wherein the control device is configured to transmit at least one signal to dispense a set quantity of liquid in a selected type of preparation to the sanitary fitting, in such a way that before reaching the complete dispensing of the set quantity, exclusively a neutral liquid, for example, non-prepared liquid, is dispensed by means of the sanitary fitting, and after complete dispensing of the set quantity by means of the sanitary fitting, the dispensing is stopped, so that after complete dispensing of the set quantity, prepared liquid has been dispensed in the set quantity and type of preparation by means of the sanitary fitting.

The term "prepared liquid" is to be understood in the broadest meaning and refers for example, in the claims, to liquids, for example water in the form of tap water from a water supplier or the like, which is additionally changed in its properties and/or in its composition by a separate device. Thus, for example, prepared water can have a high temperature, so-called very hot water, a different degree of carbonization, a partially different composition, or the like than water originally provided by the water supplier. The term "prepared liquid" is not to be understood as hot or cold water which is typically provided from a water supplier to a single-family house, multifamily house, or the like and is possibly modified in its temperature via a heater or the like.

The term "neutral liquid" is to be understood in the broadest meaning and refers for example, in the claims, to liquids which, at least sensorially, for example, with respect to taste or smell, have virtually no effects on the prepared liquid. For example, the neutral liquid can be unfiltered or filtered water.

The term "type of preparation" is to be understood in the broadest meaning and refers for example, in the claims, not only to the fundamental type of the preparation of a liquid, for example, whether the water has been carbonated or not, but rather also the degree, the intensity, or the concentration of the preparation, for example, the intensity of the carbonization. Different types of preparation are thus to be understood, for example, as different degrees of carbonization, for example, "still", "medium", or "classic". Different types of preparation are also to be understood as different temperatures of very hot water, water filtered to varying degrees, different concentrations of flavor additives and/or flavors, different types of mineralization and the different concentrations thereof and of different concentrations of the same type of mineralization or the like. The term "type of preparation" also includes "non-preparation".

One of the advantages thus achieved is that the operability and flexibility are thus substantially improved. A further advantage is that simple and cost-effective implementation and/or simple and cost-effective performance is provided.

Further features, advantages, and further embodiments of the disclosure are described hereafter or thus become obvious.

According to one advantageous refinement, a first display device is arranged, which is configured to display at least two different types of preparation. This improves the operability of the sanitary fitting with higher flexibility in the selection of various types of preparation at the same time.

According to a further advantageous refinement, a second display device is arranged, which is configured to display at least one operating state and/or at least one type of preparation of the sanitary fitting. The operability of the sanitary fitting is thus also improved, in other words, incorrect operations are reduced.

According to a further advantageous refinement, at least one display device is configured for visual and/or acoustic display. In addition to enhancing the operability, this also enhances the flexibility, since a variety of different operating states and/or types of preparation can be displayed by various visual and/or acoustic signals.

According to a further advantageous refinement, at least one display device and/or at least one of the control elements is formed ring-shaped. In addition to a high level of visual impression and better perceptibility by a user of the sanitary fitting, the operability is thus also improved.

According to a further advantageous refinement, at least three visually different displays can be provided by means of the at least one display device, which is configured for the visual display. A variety of possible operating states or types of preparation can thus be displayed in a simple manner.

According to a further advantageous refinement, two display devices are arranged, which are arranged on axially different sides of the first control element. The perceptibility is thus also improved, since a user of the sanitary fitting, when actuating the first control element, can perceive a display by the two display devices directly and simultaneously. Due to the display devices arranged on different sides of the first control element, a confusion is nearly precluded even in the case of identical visual signals, for example, for the types of preparation, on the one hand, and the operating state, on the other hand.

According to a further advantageous refinement, the actuating element is actuatable by means of touching and/or pressing or contactlessly, for example, the actuating element is configured to recognize gestures. An actuation of the actuating element is thus possible in a flexible manner. The advantage of an actuation by means of touch is that, for example, pleasant haptics during the actuation can be provided for a user of the sanitary fitting. The advantage of an actuation by means of pressure is a direct feedback about the completed actuation by a user and the advantage of a contactless actuation of the actuating element is that soiling of the actuating element is nearly precluded. If the actuating element can recognize gestures, undesired actuation is further reduced, since only defined and recognized gestures allow an actuation of the actuating element. An actuation of the actuating element by means of touch is also to be understood for example, as a pressure actuation of a button.

According to a further advantageous refinement, the actuating element comprises a circular surface, for example, a point, for actuation. In addition to a harmonious and visually high-quality impression, a simple operability is provided if the actuating element is configured in the form of a circular button, point, or the like.

According to a further advantageous refinement, a single-lever mixing tap is arranged for dispensing non-prepared hot and cold water. This allows a provision of a mixture of hot and cold water in a simple and convenient manner.

According to a further advantageous refinement, at least two separate outlets are arranged, wherein at least one of the outlets is exclusively configured to dispense the non-prepared hot and cold water and wherein the at least one further outlet is configured to dispense the prepared liquid. The advantage of the separate outlets is that thus simultaneously, for example, cold water can be provided at the first outlet and prepared water can be provided at the second outlet independently of one another. The separation of the two outlets is also advantageous for hygienic reasons, for example, because of residual water.

According to a further advantageous refinement, the at least two outlets are arranged spaced apart from one another. This minimizes the ability to confuse the two outlets and enhances the flexibility at the same time, since both outlets can be used in a simple manner.

According to a further advantageous refinement, at least one of the outlets is movably arranged and comprises a detachable locking device, which is configured to detachably fix the outlet on element of the sanitary fitting, for example, by a magnetic force. One of the advantages thus achieved is simple and simultaneously flexible operability of the sanitary fitting. For example, a pivot of the outlet or a change of the height of the outlet is thus possible with simple detachability and/or fixing capability of the outlet.

According to a further advantageous refinement, the first and the at least one second control element are each actuatable by application of a rotational movement and the second control element is additionally actuatable using an axial movement. A simple operability of the two control elements with high flexibility with respect to different types of actuation of the control elements at the same time is thus provided.

According to a further advantageous refinement, the at least one second control element comprises at least two, for example, four, defined detent positions during a rotational movement. Tactile feedback is thus provided for a user of the sanitary fitting, so that inaccurate, error-prone operation of the sanitary fitting is reduced; the probability of inadvertent actuation is reduced.

According to a further advantageous refinement, multiple second control elements are arranged, which are actuatable independently of one another. This enhances the flexibility of the sanitary fitting in the selection and provision of different types of prepared water.

According to a further advantageous refinement of the sanitary system, the preparation device comprises at least one of the following devices: filter device, heating device, storage device, concentration device, carbonization device, cooling device. A variety of possible types of preparation can thus be provided for the liquid. Different prepared liquids can also be stored, so that more rapid dispensing takes place when the respective prepared liquid is selected again.

According to a further advantageous refinement of the sanitary system, a flow rate meter is arranged for measuring the flow rate of the liquid, for example, the flow rate of water, through the preparation device. The advantage of this is that, for example, an exact provision of the quantity of prepared water is provided.

According to a further advantageous refinement of the sanitary system, the control device is connected to the flow rate meter and is configured to compute a service life of an element of the preparation device on the basis of the measured flow rate and to display the service life by at least one of the display devices of the sanitary fitting. This increases the reliability of the sanitary system since, for example, filters of the filter device can be replaced in a timely manner, so that reliable filtration of the liquid, for example, water, is provided at all times.

According to a further advantageous refinement of the sanitary system, the filter device is connected to the sanitary fitting via a first valve controllable by the control device and the storage device is connected to the sanitary fitting via a second valve controllable by the control device. By use of the controllable valves, for example, prepared water can be provided by use of the filter device or from the storage device in a simple manner.

According to a further advantageous refinement, at least one of the valves is configured as a solenoid valve. This allows simple and rapid and also reliable actuation of the respective valve.

According to a further advantageous refinement of the method, the prepared liquid is dispensed for a settable time span after actuation of the actuating element. This enhances the operating convenience for a user of the sanitary fitting, since he only has to trigger the actuation using one finger, for example, and can then use both hands to fill up prepared water. A further advantage is that the prepared liquid is acquirable based on the set quantity, wherein this quantity is then ascertained by the measurement of a flow rate.

According to a further advantageous refinement of the method, upon further actuation of the actuating element during the dispensing of the prepared liquid, the dispensing is at least interrupted, for example, stopped. On the one hand, the liquid consumption can thus be reduced if, for example, only a small quantity is required, on the other hand, for example, for specific functions, a rapid shutdown of the dispensing of the prepared liquid can be provided.

According to a further advantageous refinement, at least one of the following types of preparation is provided: very hot water, filtered water, carbonated water, chilled water, water admixed with concentrate. A variety of possible types of preparation for water can thus be provided.

According to a further advantageous refinement of the method, the type of preparation is selected by rotating and axially moving the at least one control element from an axial idle position, for example, against a restoring force. The advantage of this is that the types of preparation can thus be selected in a reliable manner for dispensing correspondingly prepared liquid.

According to a further advantageous refinement, after the selection of at least one type of preparation, the at least one positioning element returns into its axial idle position, for example, by a spring force. A uniform starting position of the second control element for a variety of selection options is thus provided to the user; the operation is thus simplified as a whole.

According to a further advantageous refinement, the type of preparation very hot water is displayed by at least one of the display devices of the sanitary fitting. The advantage of this is that the risk of an incorrect operation in the case of very hot water and/or inadvertent dispensing of very hot water by user is thus reduced.

Further important features and advantages of the disclosure result from the dependent claims, from the drawings, and from the associated description of the figures on the basis of the drawings.

It is obvious that the above-mentioned features and the features to be explained hereafter are usable not only in the respective specified combination, but rather also in other combinations or alone, without leaving the scope of the disclosure.

Example embodiments of the disclosure are illustrated in the drawings and will be explained in greater detail in the following description, wherein identical reference signs refer to identical or similar or functionally identical components or elements.

IN THE FIGURES

FIG. 1 shows a three-dimensional view of a sanitary fitting according to one embodiment of the disclosure.

Figure 1:
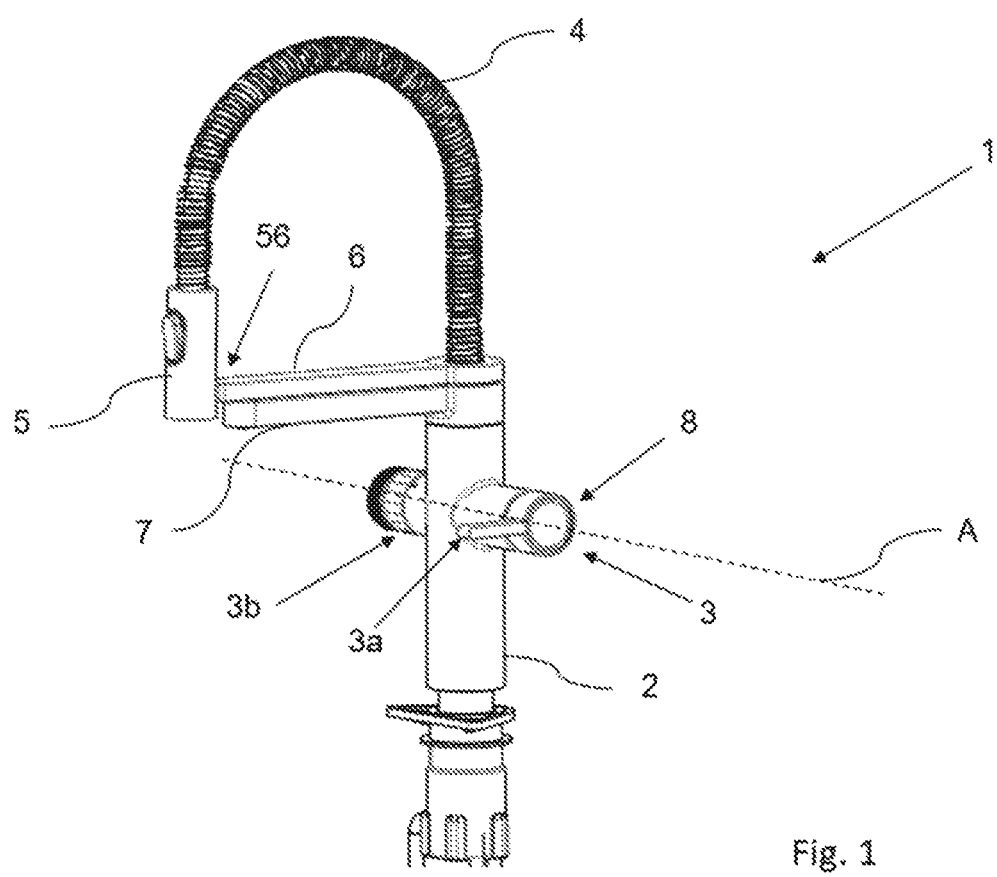
FIG. 1 shows a sanitary fitting in a three-dimensional view according to one embodiment of the disclosure.

A sanitary fitting 1 for kitchens is shown in detail in FIG. 1. The sanitary fitting 1 is part of a sanitary system 200 of FIGS. 4 and 5. In this case, the sanitary fitting 1 comprises a cylindrical fitting body 2, on which a control element device 3a, 3b is situated in each case on different sides of the fitting body 2 perpendicularly to the cylinder axis, i.e., along the axis A. In this case, the first control element device 3a is used to set a mixed water temperature and a flow rate of mixed water based on non-prepared hot and cold water. The first control element device 3a comprises for this purpose a single-lever mixing tap 8. A quantity and a type of preparation for non-prepared water can be set and dispensing of the prepared quantity of water can be triggered by the second control element device 3b, which is described in greater detail in following FIGS. 2, 3, and 7.

Furthermore, a water outlet 5, to which mixed water can be applied, is pivotably arranged on the fitting body 2 via an outlet arm 4. Moreover, the water outlet 5 is connected via a detachable connection 56 to a holding arm 6, wherein the holding arm 6 is in turn pivotably arranged on the fitting body 2 in parallel to the cylinder axis of the fitting body 2. The detachable connection 56 can be produced, for example, by a magnetic force. A further water outlet 7 is arranged on the lower side of the holding arm 6, via which prepared water, which can be set by the second control element device 3b, can be dispensed.

Figure 2:
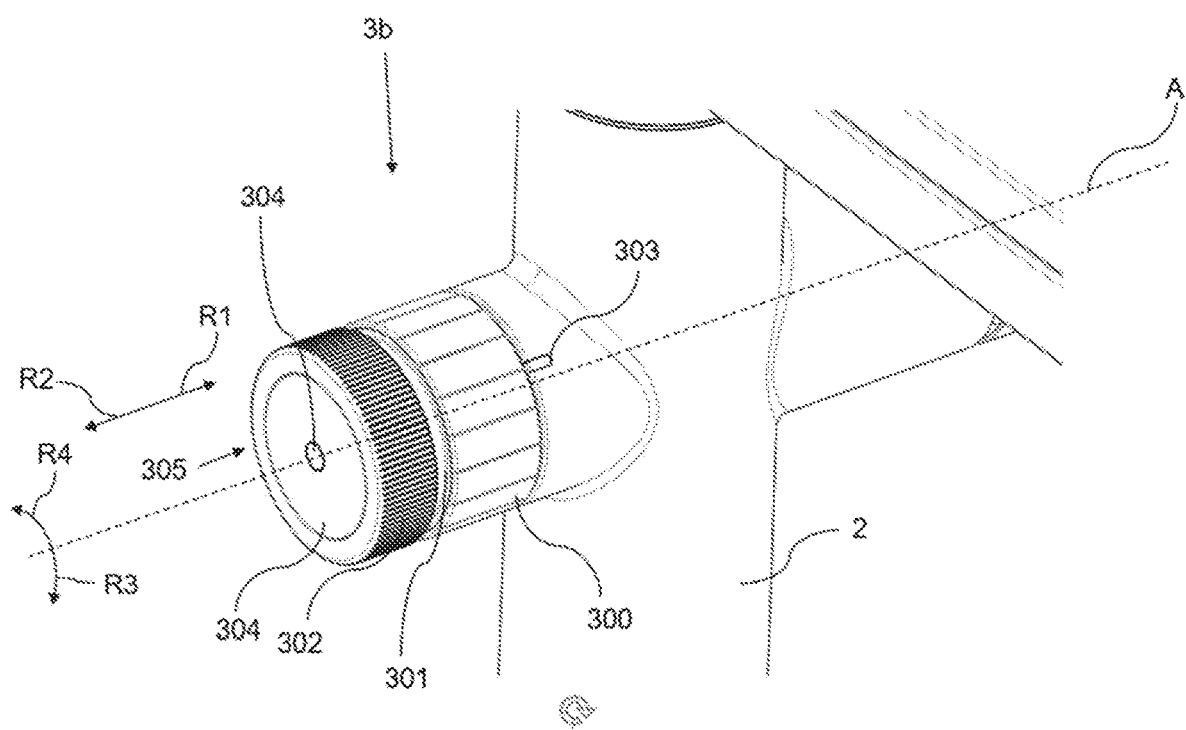
FIG. 2 shows a three-dimensional detail of the sanitary fitting according to FIG. 1.
Figure 3:
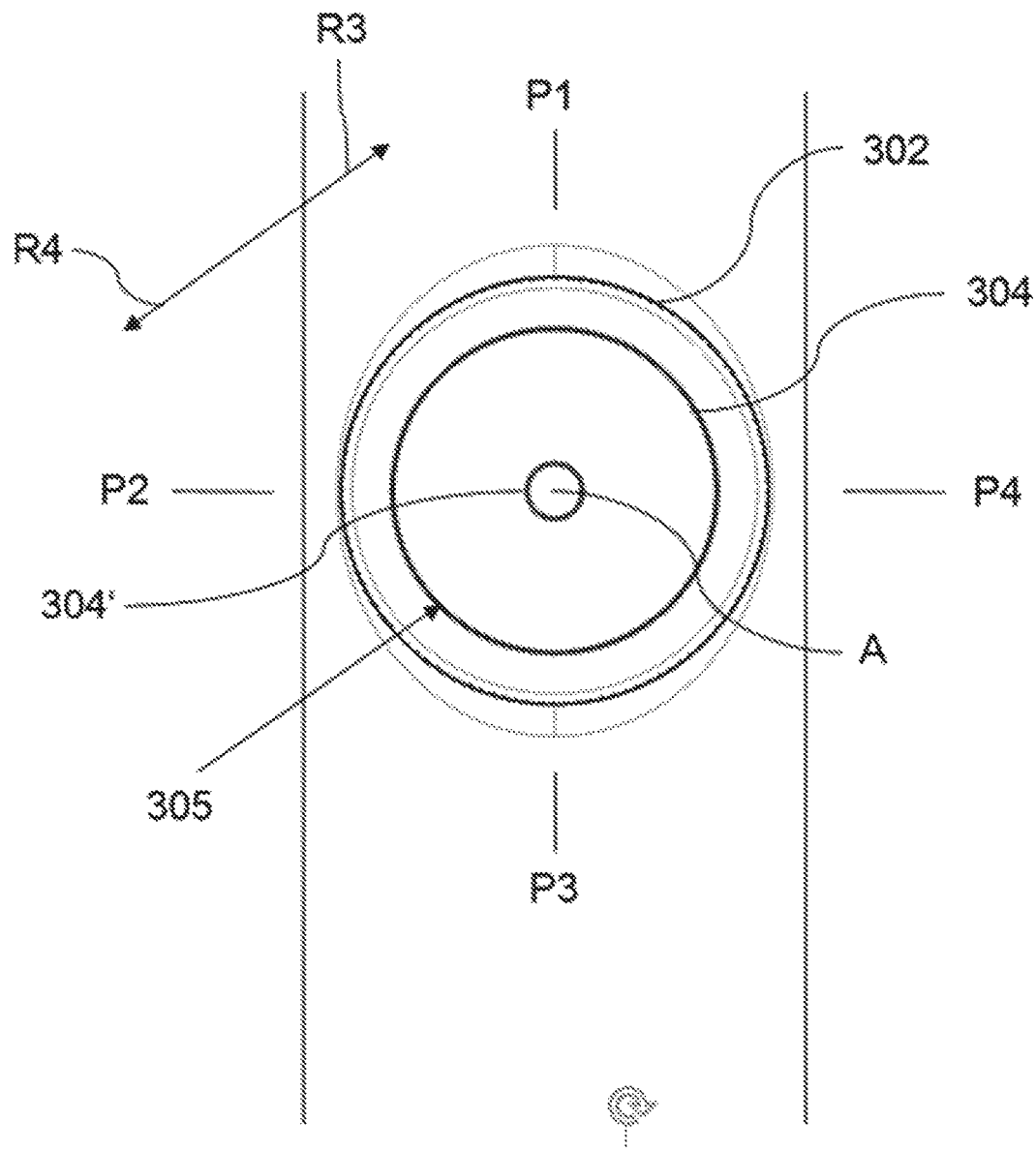
FIG. 3 shows an axial top view of a control element device of the sanitary fitting according to FIG. 2.

FIG. 2 shows a three-dimensional detail of the sanitary fitting according to FIG. 1 and FIG. 3 shows an axial top view of a control element device of the sanitary fitting of FIG. 2.

The second control element device 3b is shown in detail in FIG. 2. The second control element device 3b comprises a first control element 300 in the form of a ring rotatable around an axis A, which is arranged perpendicularly to the axis of the cylindrical fitting body 2. The first control element 300 is used for setting the quantity of the desired quantity of prepared water and is inscribed here with a numeric scale for the desired quantity in the device milliliters, here "100", "200", "300", "500", "750", and "0". The scale is embodied as nonlinear here, but can also be embodied as linear in a further embodiment. In addition, other or modified scales can also be used.

A marking 303 which, on the one hand, permits an assignment of the set quantity by the first control element 300, is arranged along the axis A in FIG. 2 on the right adjacent to the first control element 300. On the other hand, the marking 303 is formed as a second display device adjacent to a first display device 301. The first display device 301 is arranged on the left side of the first control element 300 and is embodied as ring-shaped. Various color representations can be displayed by the first display device 301, for example, at least the colors red, white, green, yellow, and/or orange or the like. Various lighted colors can also be displayed by the second display device 303, in particular, the colors red and blue. Each of the two display devices 301, 303 can also display the color intermittently, in other words provide flashing in the respective color. The display devices 301, 303 can alternatively or additionally also provide acoustic signals, for example, an intermittent beeping or the like.

Furthermore, the second control element device 3b comprises a second control element 302, which is also formed ring-shaped and is arranged on the left adjacent to the first display device 301. The second control element 302 has ribbing on its outer circumference for better grasping by a user. On the one hand, the second control element 302 is rotatably formed having rotational directions R3, R4 around the axis A, on the other hand, it is also movably arranged in the axial direction R1, R2 along the axis A. On the face of the second control element 302 perpendicular to the axis A, a circular surface 304 having a triggering point 304' is arranged, which is used to trigger an actuating element 305. The dispensing of prepared water is triggered by the actuating element 305. The second control element 302 can be brought into four different detent positions P1, P2, P3, P4 by rotation in the direction R4. A rotation in the opposing direction R3 can be permitted, but it can also not be permitted, so that a user can only rotate the second control element 302 further in the direction R4.

The different positions P1, P2, P3, and P4, which are arranged offset in relation to one another circumferentially at 90° angles, are shown in the top view according to FIG. 3. As already stated, the actuating element 305 having the circular surface 304, which comprises the triggering point 304', is arranged on the end face. The actuating element 305 can be configured to be actuatable contactlessly or by touching the triggering point 304' in this case. The actuating element 305 can be configured in the form of an infrared sensor in this case, so that upon touching the triggering point 304' of the surface 304, the actuating element 305 is triggered.

The operation of the sanitary fitting 1 will now be explained in detail. For this purpose, the sanitary fitting 1 is firstly in the idle state/standby mode. In this case, an arbitrary quantity is set by the first control element 300, but no prepared water is dispensed. The second display device 303 then lights up blue, for example, the first display device 301 does not light up, and the triggering point 304' is active, i.e., upon a corresponding touch, the actuating element 305 is triggered.

The sanitary fitting 1 is in the so-called cleaning mode when the quantity "0" is set by the first control element. Both display devices 301, 303 do not light up and the triggering point 304' is then switched off or is not active. Incorrect operations during the cleaning are thus avoided. The cleaning mode can be configured, on the one hand, so that inadvertent water dispensing, whether prepared water and/or non-prepared water, is not possible, for example, to be able to clean the sanitary fitting 1 from the outside by wiping or the like. On the other hand, alternatively or additionally the cleaning mode can also trigger targeted conduction through of a specific cleaning liquid, for example, for descaling or the like.

To dispense prepared water, in the form of filtered water here, the first control element 300 is set to a number, i.e., a defined quantity of filtered water is to be dispensed. The second display device 303 then lights up blue, the first display device 301 does not light up. The quantity can accordingly now be adjusted or set again. By placing a finger on the triggering point 304', for example, the actuating element 305 is triggered and initiates the dispensing of the desired quantity of filtered water. In this case, the second display device 303 flashes blue, the first display device 301 does not light up. The dispensing of the prepared water can be stopped prematurely by further actuation of the triggering point 304' of the actuating element 305.

Proceeding from the idle state/standby mode, the following stages are carried out to dispense and/or tap prepared water in the form of very hot water. Firstly, the first control element 300 is set to an arbitrary number, which can correspond to the quantity of very hot water to be dispensed. In this case, the second display device 303 firstly lights up blue, the first display device 301 does not light up. Subsequently, the second control element 302 is pressed in the axial direction R1, i.e., in the direction toward the first display device 301. The second control element 302 is then rotated in the pressed state in the direction R4 or in the direction R3 from a first detent position P1, P2, P3, P4 into a next detent position P2, P3, P4, P1. The second control element 302 is subsequently released, wherein the second control element 302 moves back into its axial starting position in the direction R2. The second display device 303 now lights up red, as does the first display device 301. The very hot water function of the sanitary fitting 1 is now activated, wherein the quantity of very hot water to be set can still be changed. The desired quantity of boiling hot water can be tapped by actuating the actuating element 305, for example, by laying a finger on the triggering point 304'. It is sufficient for this purpose to lay the finger briefly on the triggering point 304' of the actuating element 305 to tap the desired quantity of very hot water. In other words, after the triggering of the actuating element 305, it no longer has to be touched. During the dispensing, the second display device 303 then flashes red and the first display device 301 flashes red to indicate the dispensing of very hot water.

The very hot water function is activated for a specific time span, for example, for 8 or 10 seconds, after the second control element 302 is back in its axial idle position. During this first time span, very hot water can be tapped by triggering the actuating element 305. If the actuating element 305 is not actuated during this time span, the sanitary fitting 1 returns back into the idle mode/standby mode.

If the actuating element 305 was activated during the mentioned first time span, in other words, very hot water was thus tapped, the second display device 303 lights up red for a second time span, while in contrast the first display device 301 no longer lights up. This indicates to a user of the sanitary fitting 1 that very hot water is still ready to be dispensed in the corresponding line. After passage of the second time span, the very hot water has cooled and the sanitary fitting 1 switches into the idle mode/standby mode, i.e., the second display device 303 then lights up blue again. For example, the duration of the second time span can be 5, 10, or 15 minutes.

During the second time span, other types of preparation and/or the dispensing of water prepared in another way besides very hot water are not possible. If the actuating element 305 is triggered within the second time span, this is visually displayed by the second display device 303, for example, by flashing red multiple times, for example, five times. In addition, the first display device 301 also flashes red multiple times, for example, corresponding to the second display device 303. Dispensing of very hot water does not take place however. Only when the actuating element 305 is actuated again after the corresponding display by the first display device 301 and by the second display device 303 can prepared water then be tapped in a type of preparation other than very hot water, which is then dispensed for example, after the very hot water which is still located in the feeds to the respective outlet.

During the dispensing of very hot water, its dispensing can be interrupted at any time by moving, more precisely pressing, the second control element 302 in the axial direction R1. The dispensing can also be interrupted by actuating the actuating element 305 and continued again by further actuation.

If interruption of the dispensing of very hot water does not occur, the dispensing of hot water can also take place as follows: if, for example, 500 mL very hot water are to be dispensed, and if, for example, the volume in the line of a very hot water provision device such as a boiler or the like is 30 mL, firstly 30 mL cold water is dispensed, followed by hot water from the boiler, the temperature of which is above the desired temperature, but upon mixing with the 30 mL cold water after dispensing of 470 mL very hot water above the desired temperature, 500 mL very hot water of the desired temperature results. The very hot water is dispensed in this case so that after dispensing of the 500 mL, cold water is provided again at the water outlet 7.

Proceeding from the idle mode/standby mode, when dispensing filtered water, the second display device 303 can provide an indication in accordance with the filter usage, for example, by green flashing, which displays the incorrect function of the filter. Therefore, if the actuating element 305 is actuated and prepared water, for example, filtered water is provided, the second display device 303 flashes green, for example, so that it is displayed to a user of the sanitary fitting 1 that the filter cartridge has to be replaced. When dispensing very hot water, a properly operating filter can be indicated by alternate flashing in the colors green and red of the second display device 303. It can also be indicated by another color of the second display device 303 that the capacity of the filter is exhausted, in other words it has to be replaced. If filtered water is tapped or dispensed, the second display device 303 lights up blue, for example, and the first display device 301 flashes green. If very hot water is tapped or dispensed, for example, the second display device 303 lights up red and the first display device flashes green.

Figure 4:
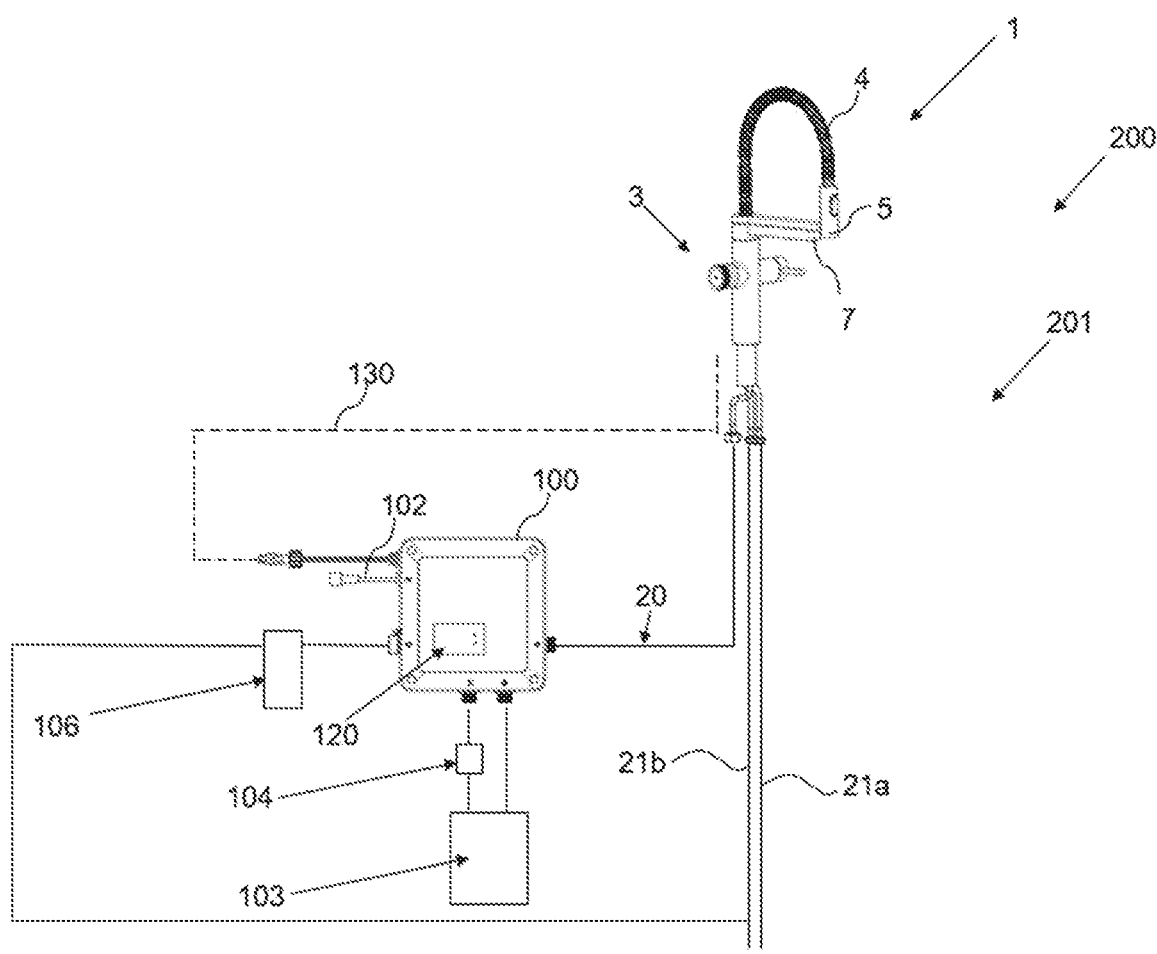
FIG. 4 shows a sanitary system according to one embodiment of the disclosure.
Figure 5:
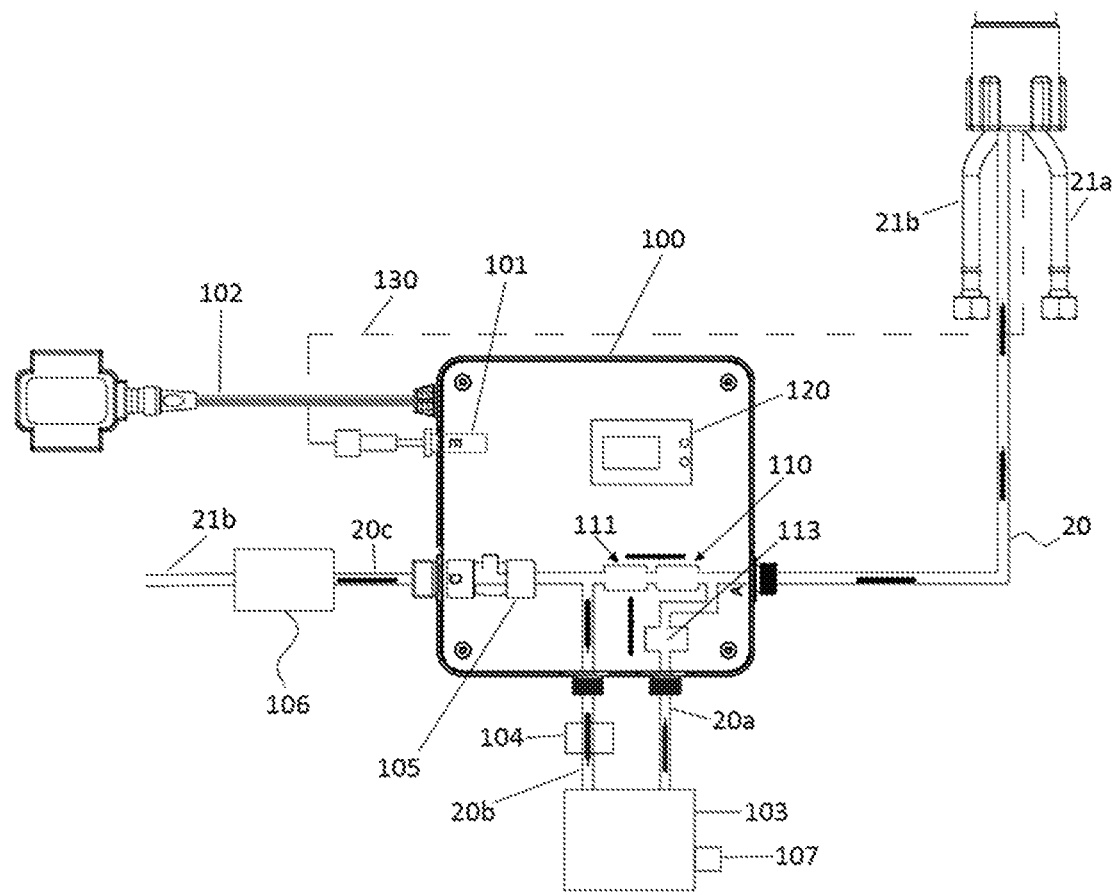
FIG. 5 shows a control device for a sanitary system according to FIG. 4 in schematic form.

FIG. 4 shows a sanitary system according to one embodiment of the disclosure and FIG. 5 shows a control device of the sanitary system according to FIG. 4 in schematic form.

FIG. 4 shows in detail a sanitary system 200 comprising a sanitary fitting 1 according to FIGS. 1-3 and a preparation device 201 and a control device 100. Specifically, a filter device 106 is arranged, which is connected to a cold water line 21b for the supply of cold water. Filtered water can then be provided by the filter device 106 via a line 20c, the control device 100, and via a line 20 which is connected to the water outlet 7. This filtered water is conducted through a flow rate meter 105 of the control device 100 and the through-flow quantity is measured. The control device 100 is configured to ascertain on the basis of the quantity of the measured flow rate when a filter cartridge of the filter device 106 has to be replaced. A quantity control device 110, which comprises a plurality of valves 111, 113, is arranged downstream of the flow rate meter 105. A high-pressure boiler 103 for very hot water, which is connected to a heating device 107, is connected thereto via a supply line 20b and a safety device 104. Very hot water can then be applied to the line 20 via a second line 20a via the quantity control device 110 and can be dispensed via the water outlet 7.

The control device 100 comprises an electronic controller 101 and is connected via a signal line 130 to the two control elements 300, 302, the two display devices 301, 303, and to the actuating element 305 for corresponding control or actuation thereof, respectively. The control device 100 is furthermore connected to a power supply 102 for its operation. Filtered water or very hot water can be dispensed via the line 20 via the water outlet 7. The hot water line 21a and the cold water line 21b are connected via the first control element device 3a using the mixing tap to the first water outlet 5 and it can accordingly dispense mixed water having corresponding temperature via this.

FIG. 5 shows the control device 100 in detail. The control device 100 comprises, in addition to the electronic controller 101, a display screen 120 in the form of a touch panel or the like, using which the control device 100 can be programmed, for example, the corresponding time spans for the provision of the hot water function after actuating the second actuating element 300, the setting of the filter capacity in dependence on the water hardness or the like. The safety device 104 is used to avoid an overpressure during heating in the hot water boiler 103.

The control device 100 is furthermore configured so that a user, when this user selects a quantity of prepared water—this applies in general for any fluid or liquid—it is provided so that the dispensed quantity of water corresponds to the selected quantity, at the same time in the dispensed quantity of water, a portion of non-prepared water is present in such a way that the degree of the preparation of the prepared water corresponds to the selected degree and at the water outlet—identified here by reference sign 7—non-prepared water is provided after dispensing of the set quantity.

In other words, the control device 100 is configured as follows, for example: In the case of the type of preparation "carbonated water" having a degree of carbonization "2", selected solely by way of example, the water is prepared having a degree of carbonization 2.2, i.e., having a higher degree of carbonization than that set. If a quantity of 0.5 L is not to be dispensed, carbonated water having degree "2.2" is provided in the quantity 416.6666 mL. This quantity is then firstly dispensed. Subsequently, the quantity 500 ml-416.666 ml=83.333 ml of non-prepared water is dispensed as neutral liquid, i.e., having degree of carbonization "1", so that on average 500 mL having a degree of carbonization "2" was dispensed. This makes additional flushing of the line with neutral liquid, for example, when adding fruit juice concentrate to non-prepared water or the like, unnecessary. Dribbling at the outlet is thus avoided.

Figure 6:
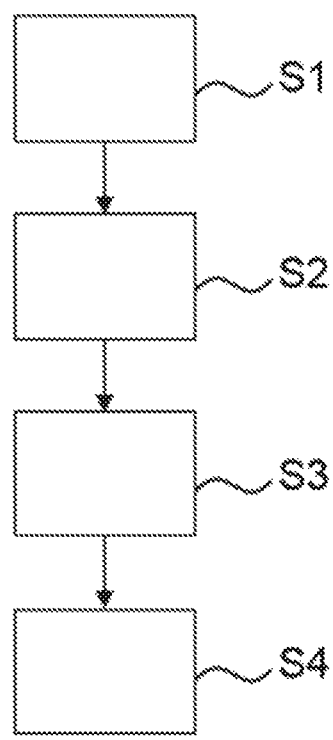
FIG. 6 shows a method for providing and dispensing prepared liquids, water, according to one embodiment of the disclosure.

FIG. 6 shows a method for providing and dispensing prepared liquid according to one embodiment of the disclosure.

FIG. 6 shows a method for providing and dispensing prepared water for beverages using a sanitary fitting according to any one of claims 1 to 15.

The method comprises the following stages in this case:

In a first stage S1, setting of a quantity of prepared liquid to be dispensed is performed by the first control element.

In a further stage S2 or S2', providing or setting of at least one type of preparation from at least two different types of preparation of non-prepared liquid is performed by the second control element.

In a further stage S3, actuating of the actuating element is performed.

In a further stage S4, dispensing of prepared liquid and a neutral liquid is performed, for example, non-prepared liquid, for example water, in such a way that before reaching the cycle quantity, exclusively neutral liquid is provided for dispensing and is dispensed, and upon reaching the set quantity, the dispensing is stopped.

Figure 7:
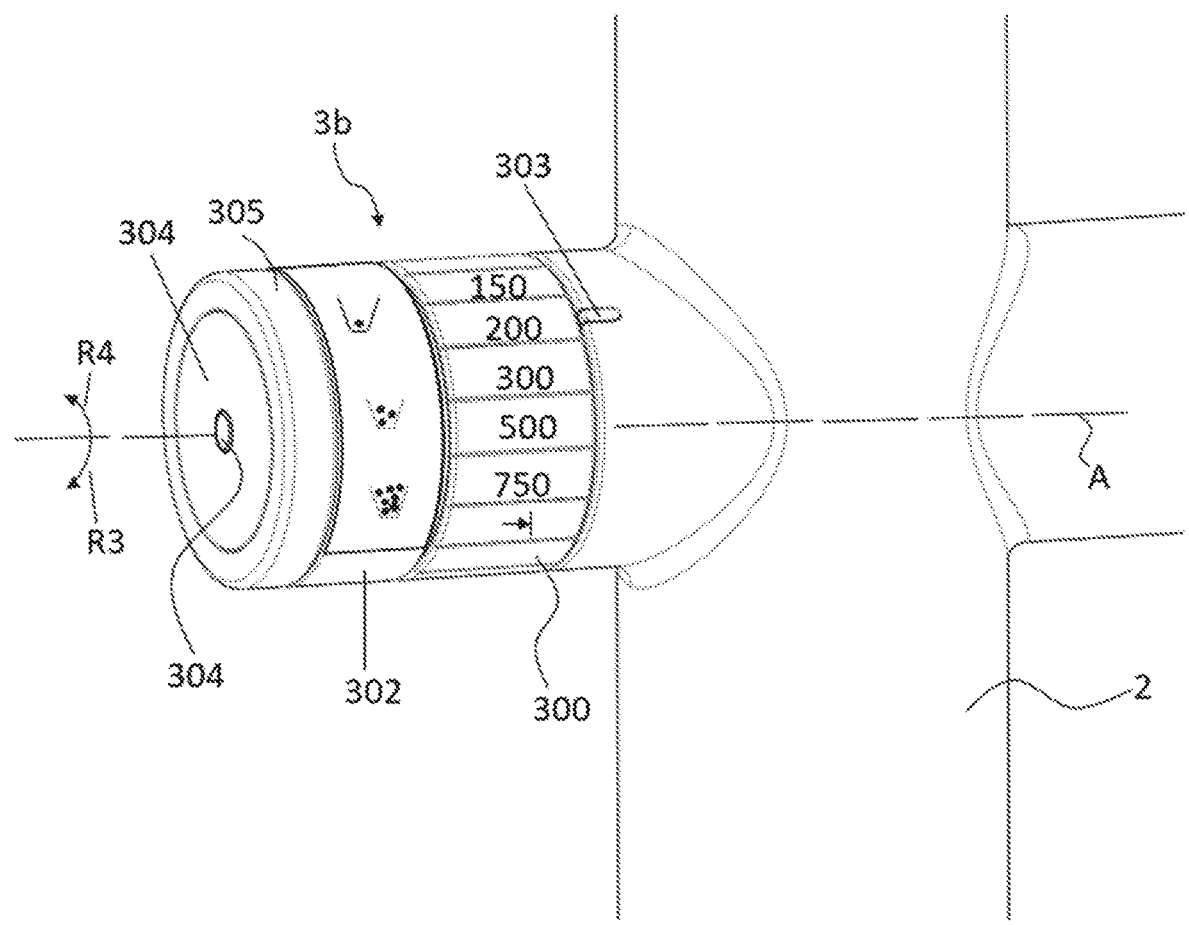
FIG. 7 shows a three-dimensional detail of a sanitary fitting according to one embodiment of the disclosure.

FIG. 7 shows a three-dimensional detail of the sanitary fitting according to a further embodiment of the disclosure.

FIG. 7 shows a sanitary fitting 1 according to FIG. 2. In contrast to the sanitary fitting 1 according to FIG. 2, the sanitary fitting 1 according to FIG. 7 comprises a second control element 302, using which the degree of carbonization of water to be dispensed can be set. The second control element 302 can for this purpose provide, for example, in different detent positions P1, P2, P3, P4, the selection of a dispensation of carbonated water having different degrees of carbonization. The detent positions P1-P4 differ in this case from the detent positions P1-P4 of FIG. 3. Alternatively, it is also conceivable to arrange, for example, three or more control elements adjacent to one another or integrate them one inside another, for example, supplementing the embodiment shown in FIG. 7 having the two control elements 300, 302 with the axially displaceable control element 302 of the embodiment of FIG. 2 and the display device 301, so that, from left to right in FIG. 7, the following arrangement results: second control element 302 for setting the degree of carbonization and simultaneously for setting very hot water with integrated ring-shaped actuating element 305, wherein the very hot water function can be triggered by axial displacement according to FIG. 2, display device 301, first control element 300 for setting the quantity, and the second display device 303 on the right adjacent thereto.

In summary, at least one of the embodiments of the disclosure comprises at least one of the following advantages:

Only dispensing the requested quantity in the requested type of preparation.

Automatic stopping after the dispensing.

No dribbling at the sanitary fitting.

High flexibility.

Simple production and implementation.

Simple performance.

Reliable and flexible dispensing of prepared water.

Although the disclosure was described on the basis of exemplary embodiments, it is not restricted thereto, but rather is modifiable in manifold ways.

LIST OF REFERENCE SIGNS 1 sanitary fitting
2 fitting body
3a, 3b control element device
4 outlet arm
5 water outlet
6 holding arm
7 water outlet
8 single-lever mixing tap
20a, 20b, 20c line
21a hot water line
21b cold water line
100 control device
101 electronic controller
102 power supply
103 high-pressure boiler
104 safety device
105 flow rate meter
106 filter device
107 heating device
110, 111, 113 valve
120 display screen
130 signal line
200 sanitary system
201 preparation device
300, 302 control element
301, 303 display device
304 circular surface
304' triggering point
305 actuating element

The invention claimed is:

1. A sanitary fitting configured to dispense prepared liquids including beverages,
the sanitary fitting comprising:
a first control element configured to set a quantity of a prepared liquid to be dispensed and an actuating element configured to dispense the prepared liquid and stop dispensing the prepared liquid upon dispensing the quantity set by the first control element;
at least one second control element; and
at least one display device,
wherein the at least one second control element is configured to select a type of preparation from at least two different types of preparations of non-prepared liquid,
wherein the first and the at least one second control element are actuatable independently of one another,
wherein a first display device is configured to display at least two different types of preparation, and/or
wherein a second display device is configured to display at least one operating state of the sanitary fitting.

2. The sanitary fitting as claimed in claim 1, wherein the at least one display device is configured to provide a visual display and/or an acoustic output signal,
wherein the at least one display device and/or at least one of the first or second control elements is configured to have a ring shape, and/or
wherein the at least one display device is configured to provide at least three visually different displays.

3. The sanitary fitting as claimed in claim 2, further comprising two display devices positioned along an axial direction on different sides of the first control element.

4. The sanitary fitting as claimed in claim 1, wherein the actuating element is actuatable by touching and/or pressing, or is actuatable contactlessly,
wherein, when operating in contactless actuation mode, the actuating element is configured to recognize gestures.

5. The sanitary fitting as claimed in claim 4, wherein actuating element further comprises a circular surface having an actuation point.

6. The sanitary fitting as claimed in claim 1, further comprising:
a single lever mixing tap that is configured to dispense non-prepared hot and cold water; and
at least two separate outlets,
wherein a first one of the at least two separate outlets is configured to exclusively dispense the non-prepared hot and cold water, and
wherein a second one of the at least two separate outlets is configured to dispense the prepared liquid,
wherein the at least two outlets are arranged spaced apart from one another, and/or
wherein at least one of the first and second outlets is movably configured, and includes a detachable locking device, the detachable locking device configured to detachably fix a position of the movable first or second outlet on an element of the sanitary fitting.

7. The sanitary fitting as claimed in claim 6, wherein the detachable locking device operates via a magnetic force.

8. The sanitary fitting as claimed in claim 1, wherein the first and second control elements are each actuatable by an imposed rotational movement and the second control element is additionally actuatable by an imposed axial movement, and
wherein the second control element has at least two detent positions during rotational movement.

9. The sanitary fitting as claimed in claim 8, wherein the second control element has four defined detent positions during a rotational movement, and/or
wherein the sanitary fitting further comprises multiple second control elements that are actuatable independently of one another.

10. A sanitary system configured to dispense prepared liquids including beverages, the sanitary system comprising:
a sanitary fitting as claimed in claim 1;
a preparation device, which is connected to the sanitary fitting, the preparation device configured to provide a prepared liquid to the sanitary fitting; and
a control device connected to the sanitary fitting and to the preparation device, the control device configured to control the sanitary fitting and the preparation device.

11. The sanitary system as claimed in claim 10, further comprising:
a filter device; and
a flow rate meter that is configured to measure a flow rate of the liquid,
wherein the flow rate meter is further configured to measure a flow rate of water through the filter device, and/or
wherein the control device is connected to the flow rate meter and is configured to compute a service life of a filter component of the filter device based on a measured flow rate, and
wherein the control device is configured to control the at least one display device to display the computed service life.

12. The sanitary system as claimed in claim 11, further comprising:
a storage device;
a first valve; and
a second valve,
wherein the filter device is connected to the sanitary fitting via the first valve which is configured to be controlled by the control device, and
wherein the storage device is connected to the sanitary fitting via the second valve which is configured to be controlled by the control device.

13. The sanitary system as claimed in claim 12, wherein at least one of the first and second valves includes a solenoid valve.

14. The sanitary system as claimed in claim 10, wherein the control device is configured to control the sanitary system to dispense a set quantity of a liquid including a prepared liquid and a neutral liquid in a selected type of preparation, by performing operations including:
setting, by the first control element of the sanitary fitting, a quantity of prepared liquid to be dispensed;
providing or setting, by the at least one second control element of the sanitary fitting, at least one type of preparation, wherein the type of preparation is selected from at least two different types of preparation of a non-prepared liquid;
actuating the actuating element of the sanitary fitting; and
dispensing a prepared liquid and a neutral liquid, by performing operations including:
dispensing a first portion of prepared liquid; and
dispensing a second portion of a neutral liquid, such that before reaching the set quantity, exclusively neutral liquid is dispensed, and that the dispensing is stopped upon reaching the set quantity,
wherein after complete dispensing of the set quantity, prepared liquid has been dispensed in the set quantity and type of preparation.

15. The sanitary system as claimed in claim 10, wherein the preparation device comprises at least one of a filter device, a heating device, a storage device, a concentration device, a carbonization device, and a cooling device.

* * * * *